Figure 1:
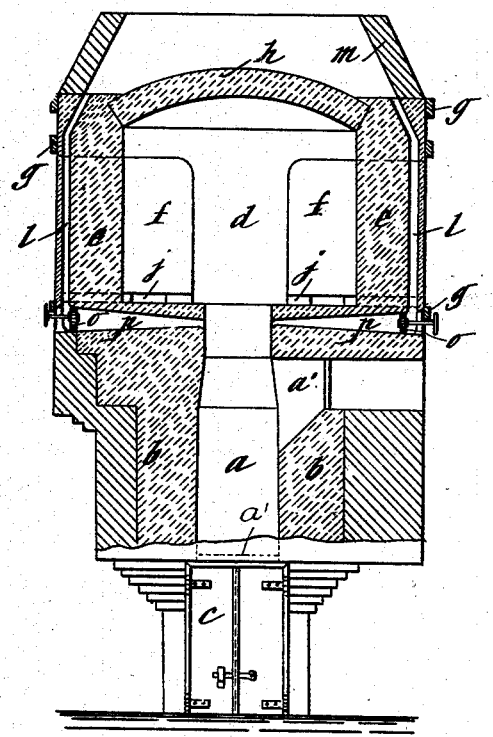

No. 714,473. Patented Nov. 25, 1902.
E. GEILLE.
MUFFLE FURNACE.
(Application filed Oct. 30, 1901.)

(No Model.)

Witnesses
W. P. Hammond
C. von Grueber

Inventor
Emile Geille
By Knight Bros.
Attys.

UNITED STATES PATENT OFFICE.

EMILE GEILLE, OF BRUSSELS, BELGIUM.

MUFFLE-FURNACE.

SPECIFICATION forming part of Letters Patent No. 714,473, dated November 25, 1902.

Application filed October 30, 1901. Serial No. 80,543. (No model.)

*To all whom it may concern:*

Be it known that I, EMILE GEILLE, a subject of the King of Belgium, residing at 17, 19, 21 Rue Jennart, Brussels, in the Kingdom of Belgium, have invented new and useful Improvements in or Relating to Muffle-Furnaces, (for which patents have been filed in Belgium, dated April 4, 1901, No. 155,759; in Germany, dated April 30, 1901, number of certificate 2,439, and in France, dated October 16, 1901, number of certificate 303,716,) of which the following is a full, clear, and exact description.

The present invention relates to a furnace for use in glass and similar manufactories comprising a series of muffles arranged upon a single ordinary furnace adapted to treat a large number of articles with a minimum expenditure of fuel, and to maintain at will an equal temperature in all the muffles or different temperatures in one or more muffles or compartments, so as to be able to treat the articles in all the phases of their manufacture in the same furnace, and thus to avoid all injurious cooling due to transfer from one furnace to another, as well as the loss of time and work resulting therefrom. The advantages resulting from this operation are of especial importance in the manufacture of cheap glass articles, such as glass bricks for paving purposes or the like, because such manufacture is based on the use of waste glass to be remelted in molds beyond the reach of the flame, thus enabling enormous quantities to be treated simultaneously in the furnace in a series of muffles, especially if each muffle in itself is of large dimensions, particularly with regard to height, such form being suitable for each muffle of the whole series, according to the system of furnace of which they form part and to the mode of heating, and which arrangement has, further, the advantage of allowing the treatment of large articles or pieces of glass without necessitating the use of a special muffle-furnace.

This furnace is more particularly designed for burning objects of artistic glass as used for vases, figures, ornaments, facing-stones for walls, &c. These objects are more easily made of glass only partially melted, and it is for this reason that they are treated in great quantities in large muffle-furnaces, wherein the mass may be heated to any necessary temperature to vitrify the surface uniformly and in such manner as to prevent injury to the vitrified surface by smoke from the furnace. On the other hand, it is obviously impracticable to produce the objects referred to by fusion of the entire body.

In order to effect the heating to an equal degree of each of the muffles of a series—eight, for instance—by means of a single furnace, it is necessary that each muffle of the series is exposed for an equal period to the flame and hot gases delivered by the fire. This necessitates a symmetrical arrangement of the muffles with regard to the fireplace, which in practice can be advantageously effected by arranging the muffles in a circle around the center of the fireplace, and this construction is chosen for the present example. In order to effect the uniform distribution of the flame and of the hot gases and to cause each of the muffles to be submitted to its heat over its whole surface, it is further necessary, even in this circular arrangement of the muffles, to cause the flame to rise in the center of the series of muffles and to expand above them and to return toward the bottom before escaping into the atmosphere. This mode of working obviously requires the superposition of the muffle series above the fireplace and the arrangement of the muffles in a chamber of such a construction as to permit the required direction of the hot gases.

Figure 2:
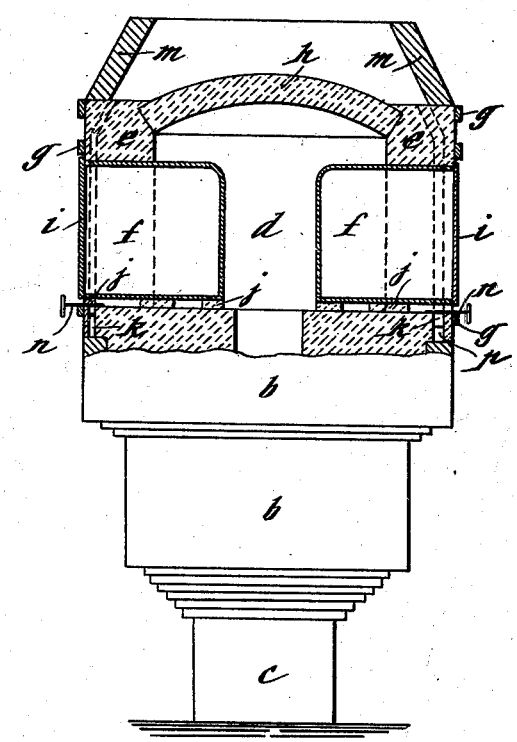
Figure 3:
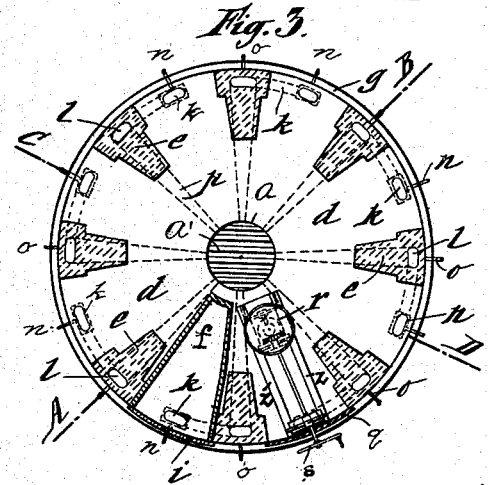
Figure 4:
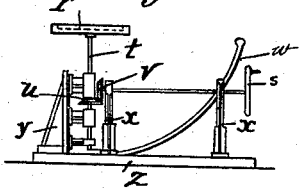
Figure 5:
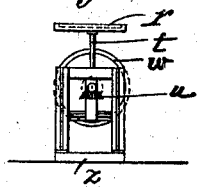
Figure 6:
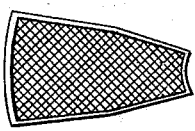

In the accompanying drawings, Figure 1 shows a vertical section through a multi-muffle-furnace, through the axis of the furnace, and through the channels on the line A B of Fig. 3. Fig. 2 is a vertical section of the furnace and of the muffles on the line C D of Fig. 3. Fig. 3 is a horizontal section of the muffle-chamber. Figs. 4 and 5 show a side elevation and a front view of the rotatory device, a plan view of which is shown in Fig. 3; and Fig. 6 shows a plan view of an open-work carrier, a certain number of which can be inserted horizontally in the muffles to carry the molds which contain the glass waste which is to be transformed into bricks or the like.

The fireplace is made in the form of a cylindrical shaft $a$, lined with massive masonry $b$, consisting partly of refractory material and partly of ordinary bricks and erected above the ash-pit c, forming the base of the furnace, the fireplace being charged with fuel through the mouth a'. A grate of usual and suitable form is mounted in customary manner in the fire-place a and at any desired height, according to draft required—for example, as illustrated in dotted lines at a'. The upper flat surface of the lining b, in which the top slightly-tapering portion of the furnace a constitutes the base of the muffle-chamber d, upon which are symmetrically arranged, with their external sides coinciding with the circumference of the base, eight pillars e of refractory material preferably of trapezoidal cross-section, tapering inward, as shown in Fig. 3. These pillars e, which are entirely independent of each other above the base, are connected together at their upper ends by arches of refractory material in such a manner that the portion above the muffles constitutes a crown of refractory material, this arrangement being strongly consolidated by means of iron bands g, one surrounding the base and the others the top of the pillar formation. The inner face of the crown, which is curved or hollowed, forms an arch h of refractory material, constituting a domed upper portion of the muffle-chamber and the top of the furnace. Muffles f are so arranged in the space between the adjacent pillars that their external part exactly coincides with the opening or space formed by the inner edge of the crown and the lateral faces of the pillars e, so that the muffle-chamber is entirely closed by the series of the muffles, which are themselves closed at their outer faces by means of convenient doors i in any suitable manner.

The muffles are not directly supported on the base of the chamber d, but rest on a ring of hard burned blocks j above the base, so as to leave a space communicating with the spaces formed on the sides by the tapering of the pillars, whereby all the external surface of the muffles is accessible to the flames and hot gases which attack them entirely, as herein described.

The flame rising in a column from the fireplace a strikes the center of the arch h, upon which it spreads out and descends to the bottom and drawn by draft in the channels k envelops the muffles. The channels k are arranged concentrically and close to the outer edge of the lining b, from which they branch off in one direction under each muffle in the base of the chamber and in another direction through the lower end of the vertical channel l, arranged in the body of the pillar e, the upper end of the channel l terminating under the hood m, which forms the base of the chimney above the furnace, as shown in Figs. 1, 2, and 3. Thus it can be seen that in this manner the flames and hot gases, drawn from eight points under the muffles, are distributed uniformly and heat to equal temperatures the eight muffles which they wholly envelop. If the muffles are not to be heated, or at least a low temperature is to be maintained in them, slides n are moved to cut off the channels k, and valves o in the eight radial channels p are opened, which channels extend horizontally through the masonry from the top of the fireplace a and communicate with the vertical channels l at the points where the latter meet with the concentric channels k, thus causing the flames and gases to pass to a great extent directly from the fireplace through the channels n l to the chimney m without coming in contact with and heating the muffles. The lowest temperature exists in the muffles when the slides n are closed and the valves o quite open, while a higher temperature can be obtained by using the furnace with both the slides n and valves o open, and this temperature can be varied if the valves o are only partly closed, leaving the slides n open, and under these conditions the temperature, although variable, is always the same for all the muffles. On the other hand it is perfectly possible to maintain different temperatures in one or more of the muffles by correspondingly regulating the slides n and valves o so that one can use one or more of the muffles at will for melting and the others for reheating the articles, and vice versa.

Owing to the described construction of the colonnade-chamber independent of the muffles with its spaces between the pillars the muffles can be arranged in position in any desired manner—for instance, they may be permanently arranged or removable, and they can be made of iron or any other fire-resisting material. They may be quite empty if they are destined for large articles, or they may be provided with lattice-work plates or shelves, as shown in Fig. 6, which are arranged on lateral ribs at the sides of the muffles when a large number of small articles are to be treated in molds, their openings allowing all parts to be suitably heated.

The above arrangement of removable muffles allow one or more of the spaces or bays between the pillars to be used when required for the insertion of other instruments or fittings, such as the rotatory support shown in Figs. 3, 4, and 5. In this case the muffle-chamber forms a simple reverberatory furnace, the corresponding space or bay of which is closed by a double door q, through which extends the spindle for the operation of the device by turning its external hand-wheel.

The device represented in detail in Figs. 4 and 5 is particularly designed to effect the exposure of all parts of the objects equally to the heat of the furnace. It consists of a simple rotatable table comprising a supporting-plate r, turning with the vertical shaft t, on which is fixed a bevel-pinion u, meshing with another bevel-pinion v, mounted upon a horizontal shaft provided with a hand-wheel s, which serves for operating the mechanism. These parts are supported by posts $xx$ and $y$ and base $z$ and may be provided with a rod $w$, by means of which one is enabled to insert the above-mentioned rotatable table and its accessories in place of a muffle above the bottom of the furnace. If it be desired to give a shining glazed surface to the objects produced and impart thereto a uniform, smooth, and even surface, the articles are placed in the plate $r$ and the latter rotated, so as to expose all parts of the surface uniformly to the requisite heat.

The articles to be submitted to the flames are placed upon the support $r$ and directly exposed to the flames, while the hand-wheel $s$ is turned to keep them in rotation in order to submit the articles on all sides and as long as required to the variable intensity of the flame, whereby there can be carried out in one furnace in a continuous manner all the phases of the working process out of contact with or in the presence of flames with a minimum amount of hand-work and fuel consumption while obtaining the finest quality of work.

I claim—

1. A multimuffle-furnace comprising a central fireplace $a$; an annular colonnade of pillars $e$ forming a muffle-chamber $d$ with radial spaces between said pillars $e$; a reverberatory arch $h$ supported by said pillars above the muffle-chamber; muffles $f$ of suitable form in the chamber $d$; a concentric series of passages $k$ beneath the muffles $f$; discharge-flues $l$ in the pillars $e$ connected with the passages $k$; and a chimney-crown $m$ beneath which the flues $l$ discharge, substantially as herein shown and described.

2. The combination of the central fireplace $a$; muffle-chamber $d$ above said fireplace; reverberatory arch $h$ forming the top of the muffle-chamber; concentric colonnade of pillars $e$ surrounding the muffle-chamber $d$ and supporting the arch $h$; muffles $f$ between the columns $e$; detached blocks $j$ of refractory material on which the muffles $f$ are supported, providing spaces for passage of gas beneath said muffles; outlet-passages $k$ in the floor of the muffle-chamber beneath the muffles; valves $n$ by which said outlet-passages $k$ can be opened or closed at will; discharge-flues $l$ in the pillars $e$ communicating with the passages $k$; and a chimney-crown $m$ beneath which the flues $l$ discharge the gases, substantially as described.

3. The combination of the central fireplace $a$; muffle-chamber $d$ above said fireplace; reverberatory arch $h$ forming the top of the muffle-chamber; concentric colonnade of pillars $e$ surrounding the muffle-chamber $d$ and supporting the arch $h$; muffles $f$ between the columns $e$; detached blocks $j$ of refractory material on which the muffles $f$ are supported, providing spaces for passage of gas beneath said muffles; outlet-passages $k$ in the floor of the muffle-chamber beneath the muffles; valves $n$ by which said outlet-passages $k$ can be opened or closed at will; discharge-flues $l$ in the pillars $e$ communicating with the passages $k$, radial passages $p$ and valves $o$ therein, permitting direct communication between the fireplace $a$ and discharge-flues $l$; and a chimney-crown $m$ beneath which the flues $l$ discharge the gases, substantially as described.

4. The combination of the central fireplace $a$; muffle-chamber $d$ above said fireplace; annular colonnade of pillars $e$ forming radial compartments in said muffle-chamber and rotatable table $r$ for supporting articles to be treated in the radial muffle-chambers and exposing the same uniformly to the heat, as explained.

In witness whereof I have hereunto set my hand in presence of two witnesses.

EMILE GEILLE.

Witnesses:
AUG. JOERISSEN,
GREGORY PHELAN.